Nov. 10, 1964  L. M. SHOWERS, JR., ETAL  3,156,326
DOUBLE ACTING BRAKE ADJUSTER
Filed July 2, 1963  2 Sheets-Sheet 1
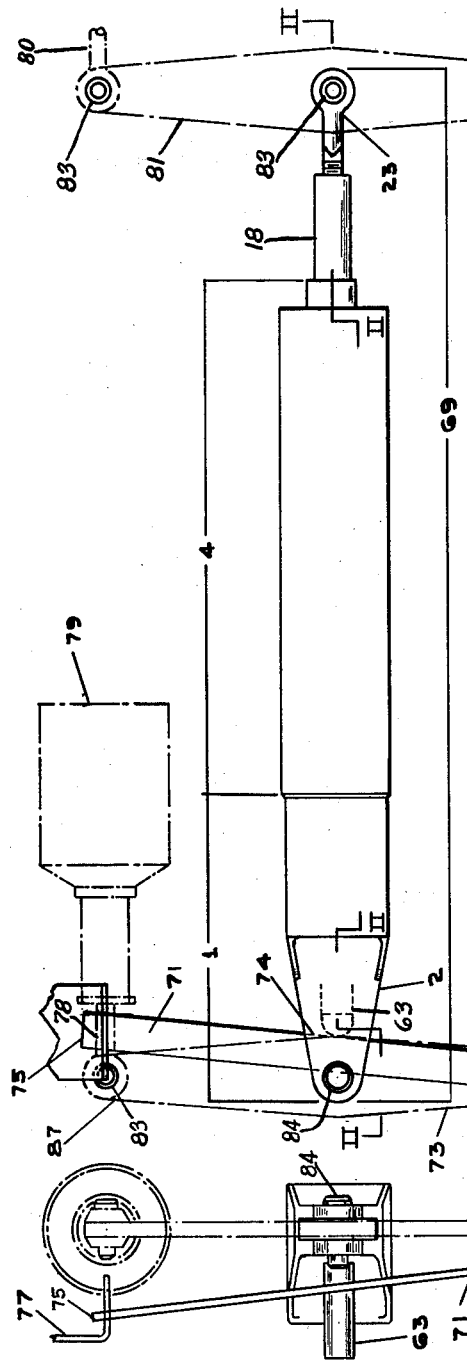
Fig. 1
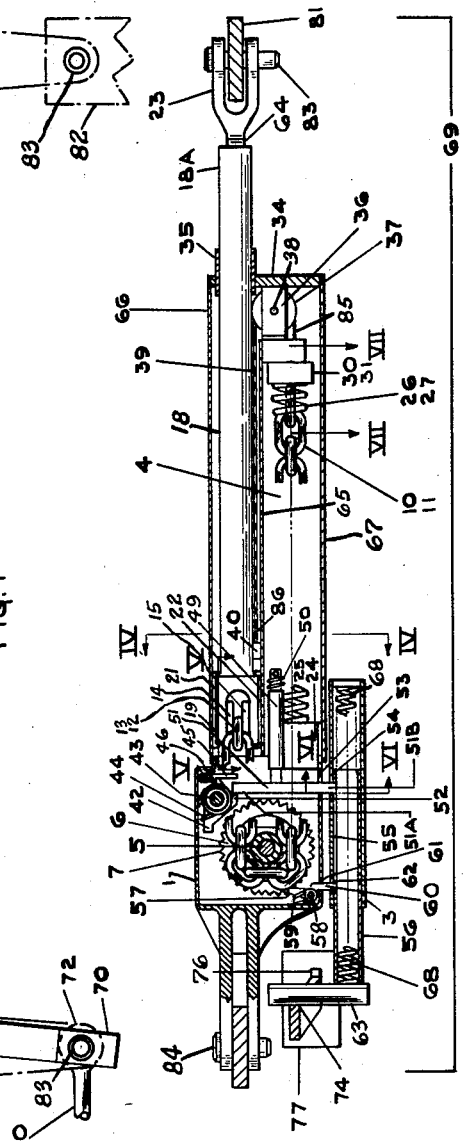
Fig. 2
Fig. 3
INVENTORS
LEWIS M. SHOWERS Jr.
CHARLES T. BISCARDI Nov. 10, 1964  L. M. SHOWERS, JR., ETAL  3,156,326
DOUBLE ACTING BRAKE ADJUSTER
Filed July 2, 1963  2 Sheets-Sheet 2
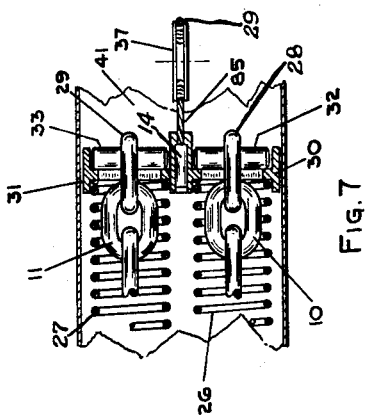
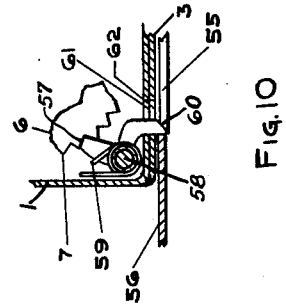
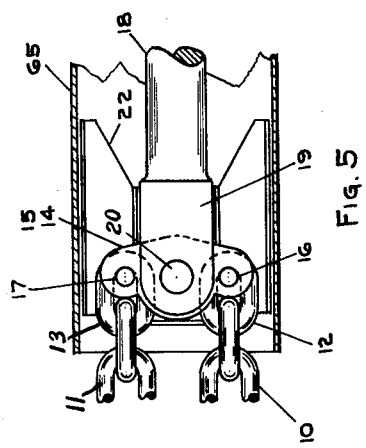
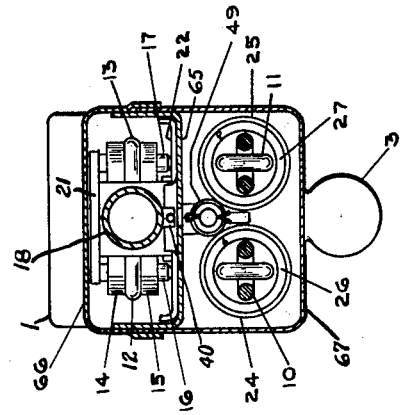
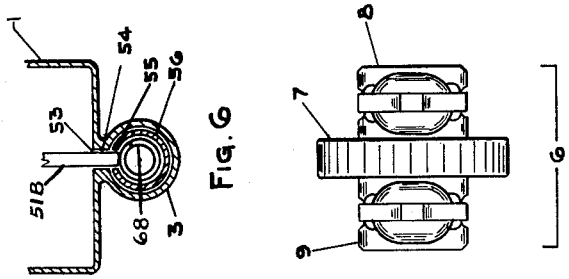
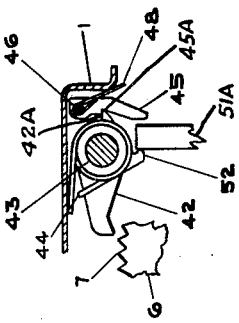
*INVENTORS*
LEWIS M. SHOWERS Jr.
CHARLES T. BISCARDI 3,156,326
DOUBLE ACTING BRAKE ADJUSTER
Lewis M. Showers, Jr., 104 E. Essex Ave., Lansdowne,
Pa., and Charles T. Biscardi, 19 E. Mill Road, Maple
Shade, N.J.
Filed July 2, 1963, Ser. No. 294,790
3 Claims. (Cl. 188—196)

This invention pertains to a device for automatically adjusting a brake system, but more particularly a brake system such as commonly used for railroad freight car brakes.

One object of this invention is to provide a device which will automatically maintain a predetermined brake cylinder push rod travel by compensating for wear of brake shoes etc. at each brake application.

It is a further object of this invention to automatically adjust, at the first brake application, for any new shoes which may have been inserted in the brake system to replace worn shoes.

The main feature of this invention is a design which requires no precision machining as do previous double acting brake adjusters.

Still additional objects, benefits and advantages of this invention will be evident from a study of the following description taken in conjunction with the accompanying drawings, in which:

FIGURE 1 is a plan view as applied to a typical brake system.

FIGURE 2 is a sectional side elevation substantially along line II—II—II—II of FIGURE 1.

FIGURE 3 is an end view of FIGURE 1.

FIGURE 4 is a sectional view along lines IV—IV, FIG. 2.

FIGURE 5 is a sectional view along lines V—V, FIG. 2.

FIGURE 6 is a sectional view along lines VI—VI, FIG. 2.

FIGURE 7 is a sectional view along lines VII—VII, FIG. 2.

FIGURE 8 is a plan view of ratchet chain sprocket.

FIGURE 9 is an enlarged view of anti-lengthening ratchet dog.

FIGURE 10 is an enlarged view of anti-shortening ratchet dog.

Referring now specifically to the drawings, a double acting brake adjuster 69, FIG. 1, made in accordance with the present invention is shown to include a ratchet chain sprocket housing 1, having an integral lever jaw 2 at one end and an integral tubular trigger spring housing guide 3, FIG. 2, at the bottom. Suitably and demountably attached to the other end of ratchet chain sprocket housing 1, FIG. 1, is a guide unit 4 guiding and supporting a brake adjusting rod 18 which is provided with an adjustable brake lever jaw 23.

Rotatively mounted on a shaft 5, FIG. 2, supported by the ratchet chain sprocket housing 1 is a ratchet chain sprocket 6 which is provided with suitable ratchet teeth 7 and suitable integral chain sprockets 8 and 9, FIG. 8, on opposite sides thereof.

In constant engagement with chain sprockets 8 and 9 are brake adjusting chains 10 and 11, FIG. 2, the end links 12 and 13 of the load portions are pivotally secured and sandwiched between opposite ends of equalizer levers 14 and 15, FIG. 4, by pins 16 and 17, FIG. 5.

Hollow brake adjusting rod 18, FIG. 2, is provided with an equalizer jaw end 19 straddling equalizer levers 14 and 15 which are pivotally attached at the center by pin 20, FIG. 5. Pins 16, 17 and 20 are retained by upper guide plate 21, FIG. 4, and lower guide plate 22.

The opposite end 18A, FIG. 2, of hollow brake adjusting rod 18 extends a suitable distance beyond brake adjusting rod guide 35 and is provided with a detachable brake lever jaw end 23 secured by means of mating thread engagement at 64.

The take-up portions of brake adjusting chains 10 and 11, FIG. 2, extending from engagement with chain sprockets 8 and 9, FIG. 8, pass through fixed take-up spring reaction collars 24 and 25, FIG. 4, and take-up springs 26 and 27, FIG. 7. The lower end links 28 and 29 of brake adjusting chains 10 and 11 are attached to take-up spring follower collars 30 and 31 by means of follower pins 32 and 33.

Guide unit 4, FIG. 1, is composed of a channel shaped frame 65, FIG. 4, demountably secured at one end to ratchet chain sprocket housing 1, FIG. 1, the other end being closed by end plate 34, FIG. 2. End plate 34 is provided with a brake adjusting rod guide 35 and an anti-creep cable sheave housing 36.

Anti-creep sheave 37 is rotatively mounted in anti-creep cable sheave housing 36 on axle pin 38.

One end 86 of anti-creep cable 39 is attached to brake adjusting rod 18 near equalizer jaw 19 by a suitable socket 40. The other end 85 of anti-creep cable 39 is attached to take-up spring follower collars 30 and 31, FIG. 7, by a suitable socket 41, thus preventing brake adjusting chains 10 and 11, FIG. 2, from becoming disengaged with ratchet chain sprocket 6, also preventing the brake adjusting rod 18 from creeping inward when brakes are in the released position.

Surrounding and housing parts supported by channel shaped frame 65 is a top cover 66 and a bottom cover 67.

Suitably mounted in ratchet chain sprocket housing 1, is an anti-lengthening dog 42, pivotally mounted on a shaft 43 and urged toward engagement with teeth 7 of ratchet chain sprocket 6 by ratchet dog spring 44.

Also suitably mounted in ratchet chain sprocket housing 1, FIG. 9, is an anti-lengthening dog latch 45 pivotally mounted on shaft 46 and urged toward engagement with projection 42A on anti-lengthening dog 42 by latch spring 48. Latching of anti-lengthening dog 42 is accomplished by sear surface 45A abutting projection 42A of anti-lengthening dog 42.

Slidably supported for longitudinal movement in guide 49, FIG. 2, and urged away from ratchet chain sprocket 6 by latch tripper spring 50 is an anti-lengthening dog lift and latch tripper 51. The upper arm 51A, FIG. 9, of anti-lengthening dog lift and latch tripper 51 is extended to abut lift projection 52 of anti-lengthening dog 42 and anti-lengthening dog trigger 45 when moved in opposite directions. The other end 51b, FIG. 2, of anti-lengthening dog lift 51 extends downward through a suitable slot 53 in ratchet chain sprocket housing 1 and slot 54 in tubular trigger spring housing guide 3 into slot 55 in trigger spring housing 56.

Suitably mounted in ratchet chain sprocket housing 1 is an anti-shortening dog 57, FIG. 10, mounted on a shaft 58 and urged toward engagement with teeth 7 of ratchet chain sprocket 6 by ratchet dog spring 59. Protruding downward from the anti-shortening dog 57 is a dog lift finger 60 extending through a suitable slot 61 in ratchet chain sprocket housing 1 and slot 62 in tubular trigger spring housing guide 3 into the slot 55 in trigger spring housing 56.

Command trigger 63, FIG. 2, extends a suitable distance upward from and is integral with trigger spring housing 56 which is slidably mounted in tubular trigger spring housing guide 3 and is urged outward by trigger spring 68.

For the purpose of showing an installation of the double acting brake adjuster 69 in a typical brake system, the principal parts of such a system are shown by dashed lines, FIG. 1 and FIG. 3.

In this system the end 70, FIG. 1, of command lever 71 is pivotally mounted as is pull rod 80 by brake pin 83 to end 72 of cylinder lever 73. Command lever 71 swings in a plane which will contact surface 74 with command trigger 63. The other end 75 of command lever 71 is inserted in a slot 76, FIG. 2, of car frame anchor 77 which is located so as to provide the required travel of cylinder push rod 78, FIG. 1, when brakes are applied.

The other components of the brake system shown by dashed lines are brake cylinder 79, truck pull rods 80, floating lever 81, floating lever anchor 82 and brake pins 83 and 84. Parts of the brake system not shown transmit pressure to the brake shoes from the brake pull rods 80.

In describing the operation of this invention it will be assumed that it has been properly installed in a brake system such as the one shown by dashed lines.

With the brakes in the released position trigger spring 68, FIG. 2, has returned trigger spring housing 56 until its travel was stopped by bottom end 51b of anti-lengthening dog lift 51 extending into slot 54 of trigger spring housing 56. In this position trigger spring housing 56, urged by trigger spring 68 has compressed the much lighter dog tripper spring 50 by forcing anti-lengthening dog lift 51 toward ratchet chain sprocket 6. By this movement anti-lengthening dog 42 has been disengaged from ratchet teeth 7 of ratchet chain sprocket 6 by upper end 51A of anti-lengthening dog lift 51 and has become latched in the disengaged position by anti-lengthening dog latch 45 which is pivotally mounted on anti-lengthening dog latch shaft 46 and urged toward the latched position by latch spring 48.

Also anti-shortening dog 57 urged by ratchet dog spring 59 has pivoted on anti-shortening dog shaft 58, with dog lift finger 60 entering slot 55 of trigger spring housing 56, until anti-shortening dog 57 has engaged ratchet teeth 7 of ratchet chain sprocket 6, thereby locking ratchet chain sprocket 6 from rotating in the shortening direction.

Ratchet chain sprocket 6 is being urged in the shortening direction by preloaded take-up springs 26 and 27 acting between fixed take-up spring collars 24 and 25 and take-up spring follower collars 30 and 31 through pins 32 and 33, FIG. 7, thus putting lower portions of brake adjusting chains 10 and 11 under tension.

When a brake application is made cylinder push rod 78, FIG. 1, moves outward from brake cylinder 79 separating end 87 of cylinder lever 73 from end 75 of command lever 71 which is anchored in slot 76, FIG. 2, of lever anchor 77. Cylinder lever 73, FIG. 1, being pivotally attached to command lever 71 by brake pin 83 causes cylinder lever 73 to separate angularly from command lever 71.

Integral lever jaw 2 of double acting brake adjuster 69 being pivotally attached by brake pin 84 to cylinder lever 73 and with command trigger 63 crossing the plane of swing of command lever 71, any separation of cylinder lever 73 and command lever 71 after contact between surface 74 of command lever 71 and command trigger 63, FIG. 2, will depress command trigger 63.

Continued movement of cylinder push rod 78, FIG. 1, will further depress command trigger 63, FIG. 2, and integral spring housing 56 overcoming resistance of command spring 68, until end of slot 55 against projection 60 of anti-shortening dog 57 rotates and disengages anti-shortening dog 57 from ratchet teeth 7 of ratchet chain sprocket 6.

With approximately the same movement of command spring housing 56 the other end of slot 55 is followed by anti-lengthening dog lifter 51. Urged by spring 50 until upper end 51a of anti-lengthening dog lifter 51 trips anti-lengthening dog latch 45 allowing ratchet dog spring 44 to rotate anti-lengthening dog 42 into engagement with ratchet chain sprocket teeth 7 of ratchet chain sprocket 6.

If lengthening of double acting brake adjuster is required, due to application of new brake shoes, etc., this takes place during the movement of the cylinder push rod 78, FIG. 1, by the ratchet action of anti-shortening dog 57, FIG. 2, up to the point where anti-lengthening dog 42 engages ratchet chain sprocket teeth 7 of ratchet chain sprocket 6. Further movement of cylinder push rod 78 is transmitted through anti-lengthening dog 42 to ratchet chain sprocket 6, brake adjusting chains 10 and 11 and brake adjusting rod 18 to brake rigging, resulting in brake shoe pressure.

If shortening of double acting brake adjuster is required due to wear on brake shoes, etc., this takes place after the movement of the cylinder push rod 78, FIG. 1, reaches the point where anti-shortening dog 57, FIG. 2, disengages ratchet chain sprocket teeth 7 of ratchet chain sprocket 6 and at approximately the same point anti-lengthening dog 42 engages ratchet chain sprocket teeth 7 of ratchet chain sprocket 6.

This is accomplished by tension on brake adjusting chains 10 and 11, FIG. 2, induced by preloaded take-up springs 26 and 27 retracting brake adjusting rod 18. During this operation ratchet action of anti-lengthening dog 42 may be required.

Having thus described our invention we claim:

1. A double acting brake adjuster for a brake linkage to resist tension loads, in combination, a ratchet chain-sprocket housing having a brake lever jaw at one end and a command trigger spring housing guide on the bottom, a brake adjusting rod guide and housing demountably attached to the other end of said ratchet chain-sprocket housing, a brake adjusting rod slidably mounted and extending a suitable distance beyond the end of said brake adjusting rod guide and housing for connection to the brake linkage, said brake adjusting rod having an adjustable brake lever jaw on the extended end and an integral equalizer lever jaw on the other end, a pair of equalizer levers pivotally attached at their centers to said integral equalizer lever jaw, a pair of parallel brake adjusting chains having the end links of the load portions pivotally attached to opposite ends of said equalizer levers to insure equal distribution of load on said parallel brake adjusting chains, upper and lower guide plates to guide the slidable motion of said integral jaw, a rotatively mounted ratchet chain sprocket in said ratchet chain-sprocket housing, said ratchet chain sprocket having two integral chain engaging sprockets disposed on opposite sides of a toothed ratchet wheel portion, said chain engaging sprockets matching said parallel brake adjusting chains, load portions of said parallel brake adjusting chains being disposed tangent to said chain sprockets, a load transferring portion of said parallel brake adjusting chains engaging arcuate portions of said chain sprockets, take-up portions of said parallel brake adjusting chains extending in a return direction parallel to said load portions, a pair of pre-compressed helical take-up springs surrounding said take-up portions, end links of said take-up portions secured to a take-up spring follower, said pre-compressed helical take-up springs being confined between said take-up chain followers and a fixed seat integral with said demountable brake adjusting rod guide to produce the take-up adjustment of brake linkage, an anti-creep cable sheave rotatively mounted on said demountable brake adjusting rod guide, an anti-creep cable looped around said anti-creep sheave with one end suitably attached to said take-up spring follower and the other end suitably attached to said brake adjusting rod near said integral equalizer lever jaw to insure the relative movement of said parallel brake adjusting chains, said chain sprocket and said brake adjusting rod, a pair of ratchet dogs including an anti-lengthening dog and an anti-shortening dog pivotally mounted in said ratchet chain sprocket housing and alternately engageable with said ratchet chain sprocket, a ratchet dog lift and tripper slidably mounted in a supporting guide for remote control of the anti-lengthening dog, a command trigger return spring housing slidably mounted in a command trigger guide, a slot in said command trigger return spring housing for alternately engaging and disengaging said ratchet dogs, ratchet dog springs for urging the ratchet dogs into engagement with ratchet teeth of ratchet chain sprocket, a command trigger secured to said command trigger spring housing, a command lever secured to the brake linkage and engageable with said command trigger for actuation of the said command trigger return spring housing during normal and over-travel brake application.

2. A double acting brake adjuster for a brake linkage to resist tension loads as set forth in claim 1, in which said ratchet chain sprocket is provided with integral ratchet teeth for engagement with said ratchet dogs as a means of adjusting and locking the said brake adjusting rod.

3. A double acting brake adjuster for a brake linkage to resist tension loads, in combination, a ratchet chain-sprocket housing having a brake lever jaw at one end and a command trigger spring housing guide on the bottom, a brake adjusting rod guide and housing demountably attached to the other end of said ratchet chain-sprocket housing, a brake adjusting rod slidably mounted and extending a suitable distance beyond the end of said brake adjusting rod guide and housing for connection to the brake linkage, said brake adjusting rod having an adjustable brake lever jaw on the extended end and an integral equalizer lever jaw on the other end, a pair of equalizer levers pivotally attached at their centers to said integral equalizer lever jaw, a pair of parallel brake adjusting chains having the end links of the load portions pivotally attached to opposite ends of said equalizer levers to insure equal distribution of load on said parallel brake adjusting chains, upper and lower guide plates to guide the slidable motion of said integral jaw, a rotatively mounted ratchet chain sprocket in said ratchet chain-sprocket housing, said ratchet chain sprocket having two integral chain engaging sprockets disposed on opposite sides of a toothed ratchet wheel portion, said chain engaging sprockets matching said parallel brake adjusting chains, load portions of said parallel brake adjusting chains being disposed tangent to said chain sprockets, load transferring portions of said parallel brake adjusting chains engaging arcuate portions of said chain sprockets, take-up portions of said parallel brake adjusting chains extending in a return direction parallel to said load portions, a pair of precompressed helical take-up springs surrounding said take-up portions, end links of said take-up portions secured to a take-up spring follower, said pre-compressed helical take-up springs being confined between said take-up chain followers and a fixed seat integral with said demountable brake adjusting rod guide to produce the take-up adjustment of brake linkage, an anti-creep cable sheave rotatively mounted on said demountable brake adjusting rod guide, an anti-creep cable looped around said anti-creep sheave with one end suitably attached to said take-up spring follower and the other end suitably attached to said brake adjusting rod near said integral equalizer lever jaw to insure the relative movement of said parallel brake adjusting chains, said chain sprocket and said brake adjusting rod, a pair of ratchet dogs including an anti-lengthening dog and an anti-shortening dog pivotally mounted in said ratchet chain sprocket housing and alternately engageable with said ratchet chain sprocket, a ratchet dog lift and tripper slidably mounted in a supporting guide for remote control of the anti-lengthening dog, a command trigger return spring housing slidably mounted in a command trigger guide, a slot in said command trigger return spring housing for alternately engaging and disengaging said ratchet dogs, ratchet dog spring for urging the ratchet dogs into engagement with ratchet teeth of ratchet chain sprocket, a command trigger secured to said command trigger spring housing, a command lever secured to the brake linkage and engageable with said command trigger for actuation of the said command trigger return spring housing during normal and over-travel brake application, in which, said anti-creep cable in combination with said parallel brake adjusting chains and attachments, complete a loop to insure constant interlocking engagement of said parallel brake adjusting chains with said integral chain engaging sprockets of said ratchet chain sprocket.

No references cited.

ARTHUR L. LA POINT, *Primary Examiner.*

DUANE A. REGER, *Examiner.*